Feb. 9, 1943.　　　　F. SHORT　　　　2,310,468
ICE MAKING APPARATUS AND METHOD
Filed Jan. 29, 1938　　　2 Sheets-Sheet 1

INVENTOR
Frank Short
BY
ATTORNEY

Feb. 9, 1943.  F. SHORT  2,310,468
ICE MAKING APPARATUS AND METHOD
Filed Jan. 29, 1938  2 Sheets-Sheet 2
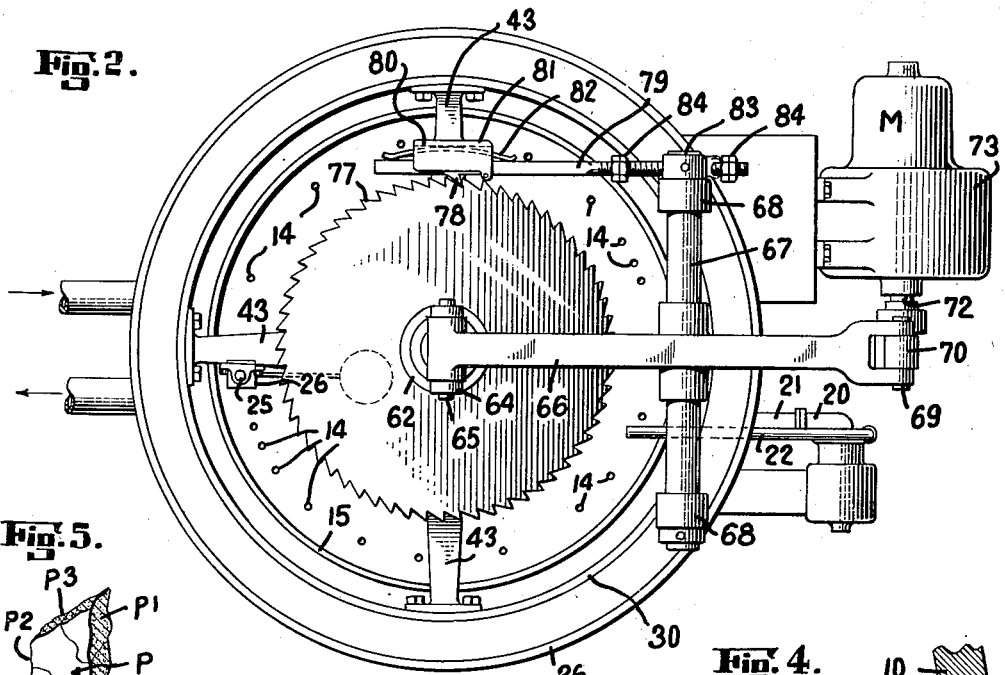
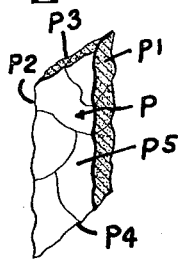
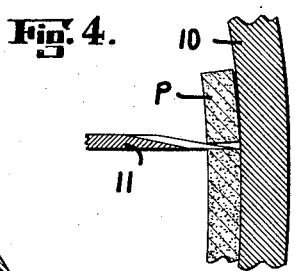
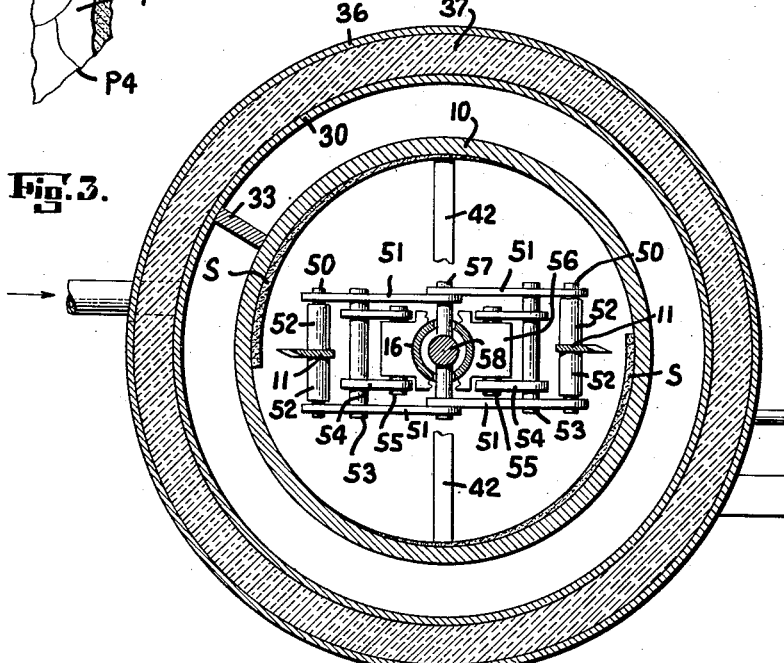
INVENTOR
*Frank Short*
BY
*ATTORNEY*

Patented Feb. 9, 1943

2,310,468

UNITED STATES PATENT OFFICE 2,310,468

ICE MAKING APPARATUS AND METHOD

Frank Short, Canton Center, Conn., assignor to Flakice Corporation, a corporation of Delaware Application January 29, 1938, Serial No. 187,761

17 Claims. (Cl. 62—106)

The invention relates to a method of and apparatus for producing ice or similar substances and to the product thereof and has for an object the provision of improvements in this art.

Among its objects the invention contemplates the separation of a solid product, such as ice or the like, from a surface by creating bodily movement of the solid product along said surface, the movement being so produced and of such a nature that the solid product is cleanly released from the surface so as then to fall by gravity or otherwise to be completely removed from the surface.

Hereinafter such movement along the surface will be referred to as "tangential" movement, whether the solid product be removed from the exterior of a cylinder, from the interior of a cylinder, from a plane surface, or from a surface of any other shape with which the invention may be practiced.

The term "ice" as used herein includes not only the usual frozen water commonly referred to as ice but also includes any frozen substance which is fragile, brittle or rigid like ice so as to be subject to formation upon and removal from a supporting surface like ice within the contemplation of the present invention. The term "ice or the like" includes not only ice and other frozen substances similar in structure, behavior and reaction to ice, but also includes other than frozen substances, which may for example, be dried, baked or otherwise formed upon a supporting surface, and which have characteristics of body structure which permit them to be removed like ice within the contemplation of the present invention.

Extending over a long period of time in the past there have been many proposals for freezing substances such as ice in relatively thin bodies or layers upon supporting refrigerating surfaces and removing the frozen bodies from the surfaces. These proposals were based on the well-known law that the time of freezing additional increments of ice upon a previously frozen layer increases in proportion to the square of the thickness of the previously frozen layer.

It has long been recognized, for example, that the time required for freezing large blocks or cakes of ice is proportionally much greater than the amount of ice produced, which as a consequence has required a great number of freezing cans and other expensive equipment as well as high labor supervision costs. This entails large central plants, heavy delivery expense and a large capital investment so that the desired extensive and economical use of ice is not fully realized.

Moreover, from an economic or refrigerating viewpoint there is apparently little actual necessity for making ice in blocks, because a fair percentage of it is eventually broken up before use anyway, and the remainder might serve its purpose as well or better in smaller pieces if properly prepared and utilized.

The principal difficulty which has retarded progress in sheet-freezing or quick-freezing methods, as contrasted with block-freezing or slow-freezing methods, apparently has been that of effectively removing the ice from the surface on which it was formed. Ice as formed adheres very tenaciously and unless and until the grip at the contacting surface between the ice and its support is overcome it is practically impossible to remove the ice in a satisfactory form or in an efficient manner.

According to the present invention the ice or similar substance is removed easily, quickly and cleanly by imparting to it a very slight tangential movement along the supporting surface, preferably by a wedge-like member which moves toward the cylinder in a direction which is approximately normal to the surface or at least which has no pronounced or rapid tangential movement such as would produce a scraping or shaving action.

When a normal or perpendicular movement is referred to, this means that at the time of action there is a movement which is principally directed toward the surface and an absence of sufficient relative tangential movement between the ice removing member and the surface to produce the scraping or shaving action referred to.

Of course, this would not exclude a tangential action of the ice-removing member while in contact with the ice after it had been loosened from the surface if such tangential movement should be found desirable for throwing the ice from the surface. Neither would it exclude the use of an equivalent for the wedge to produce the very slight initial tangential movement of the ice, such as is produced by the inclined surface of the wedge, necessary to release the ice from the surface.

The action contemplated herein may be described as a slow powerful push created by applying tangential compressive force to one edge of the body of ice to be removed, as distinguished from a rapidly acting tangential force such as a blow. A blow obviously will tend to shatter the ice without satisfactorily loosening it from its supporting surface, whereas a slow powerful tangential push will remove the body as a unit cleanly from the surface. In this manner successive edge portions of the ice sheet frozen on the congealing surface may be severed from the main body of the ice sheet and from the congealing surface without overcoming the compressive strength of the ice portions being removed. Thus the ice is separated cleanly from the freezing surface in the form of relatively large pieces.

Ordinarily, as the invention has been practiced up to the present time, the ice is formed as a continuous sheet on a supporting surface and the ice-removing member breaks this sheet along a line and removes a smaller body of ice on one side of the line of breakage by a tangential compressive force which is taken up by reaction against the much larger body of ice on the other side of the line of breakage which remains on the surface. The relatively powerful tangential compressive force is required to act through only a relatively inconsequential tangential distance so the total power requirements for removing the ice are very small, being mainly expended on inertia and friction of the mechanism.

Other objects of the invention are to provide advantageous, simple, durable and economical apparatus and practical methods for forming the solid substance on the surface and for removing it. The enumerated and other objects, advantages and features of novelty of the invention will be apparent to those skilled in the art from a consideration of the following description and accompanying drawings illustrating one mode of application or embodiment of the invention.

In the drawings:

Fig. 2 is a top plan view of the apparatus shown in Fig. 1;

Fig. 3 is a horizontal section taken on the line 3—3 of Fig. 1;

Fig. 4 is a partial enlarged section corresponding to parts shown at the right hand side of Fig. 3, the parts being shown in the act of removing a piece of ice from the cylinder; and Fig. 5 illustrates in perspective a typical piece of ice delivered by the machine.

Figure 1:
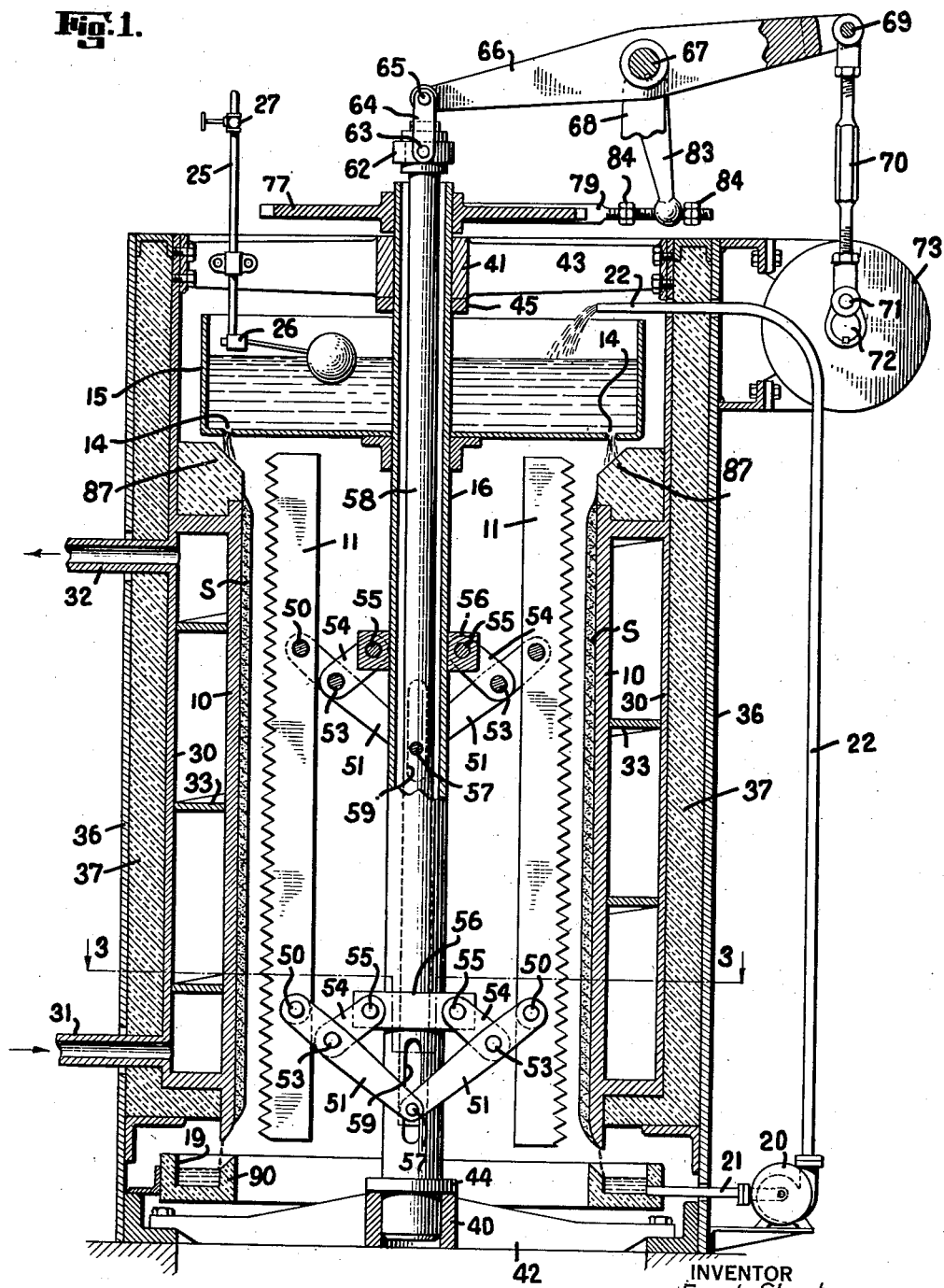
Fig. 1 is a central vertical section through one exemplary form of apparatus embodying the invention.

Referring to the drawings, the illustrated apparatus comprises a supporting surface in the form of a cylinder 10 of the internal type on which the sheet or sheets of ice S may be frozen. The two sheets of ice S on opposite sides of the cylinder are clearly shown in Fig. 3, each sheet starting with zero thickness at one vertical edge or end and increasing to the desired thickness at the other vertical edge or end. An open space intervenes between the thin end of one sheet and the thick end of the other sheet and here ice is removed from the thick ends. The same open space would exist between the adjacent thin and thick ends if only a single sheet were formed on the cylinder. In practice it has been found that goods results are obtained if the ice is permitted to attain a thickness of between ⅛" and ¼" or somewhat more before it is removed at the thick end of the sheet.

For best operating results the cylindrical surface is made quite true and relatively smooth, particularly being free from local roughness, such for example as characterizes a pickled metal surface, and may be polished, plated, lined or otherwise made smooth. It has been found that the smoothness of the metal surface and ease of ice removal increase with continued use, provided that mechanical injury of the surface is avoided.

The ice may be removed by one or more radially moving members, here shown as a pair of oppositely disposed blades 11 which are mounted and actuated to move radially outward, i. e., approximately normal or perpendicular to the surface of the cylinder during their ice-removing action.

The blades 11 are advantageously wedge-shaped at their outer edges, the inclined wedging faces preferably being disposed wholly on the side on which the ice is to be removed, in order to force the loosened pieces of ice well away from the main body of the sheets of ice and to cause the pieces to be completely removed from the surface. The blades also are preferably serrated in order to enable them more easily to penetrate the ice sheets.

After the blades 11 have removed one vertical strip of ice from the thick end of each of the sheets of ice S, as shown in Fig. 4, they are withdrawn clear of the ice sheets, as shown in Fig. 3, and moved circumferentially toward the thin ends of the ice sheets through a distance equal to the desired width of the vertical strips of ice to be removed. In the meantime the ice sheets will have thickened due to the continued freezing action.

Two blades are illustrated, this arrangement providing rapid operation and a balanced reaction with light parts; but the construction, mounting and action of both blades are identical, and one blade alone may be made to operate satisfactorily, so hereafter only one blade need be considered.

Only a relative circumferential movement between the blade and the cylinder in the interval between ice-removing actions is necessary, so that either the blade or the cylinder or both might be moved; but as a practical matter the blade alone is moved. This permits the cylinder to be mounted in a fixed position and to be of a relatively heavy rigid construction; avoids the necessity for introducing the cylinder refrigerant through moving parts; avoids freezing and binding in the blade-operating mechanism; permits cylinder insulation to be easily placed; and generally assists in the design of a very simple, inexpensive, reliable and durable type of machine.

Water or other liquid or substance to be frozen, congealed or solidified, may be supplied to the inner surface of the cylinder 10 in any approved and convenient manner. As illustrated herein, water is supplied to the upper end or edge of the cylinder through holes or nozzles 14 in an annular manifold, tank, trough or the like 15 which is mounted on a hollow central vertical shaft 16 which carries the blades 11. The trough moves circumferentially when the blades move around so that the holes in the trough always maintain a fixed positional relationship to the blades.

As shown by comparing Figs. 2 and 3, the two series of holes 14 for the two sheets of ice S are spaced apart in the region of the blades where ice is being removed so that the ice is supercooled and dry in these regions or zones. This contributes to the ease of ice removal and also prevents the pieces of ice from congealing together in a mass when removed.

As shown in Fig. 2, the holes of each series are spaced close together at one end to supply a greater volume of water to the thin end of the sheet where the freezing action is more rapid and are spaced further apart at the other end to supply a smaller volume of water to the thick end of the sheet where the freezing action is less rapid. The relative spacing of the holes is merely one way of securing the desired water distribution but this may be accomplished in other ways.

Water which does not freeze on the cylinder may flow down into an annular catch-trough 19 from which it is returned by a pump 20 through the pipes 21 and 22 to the supply trough 15. Additional water may be supplied to the trough 15 as required by any suitable means, as by a pipe 25 provided with a float valve 26. The pipe 25 may also be provided with a cut-off or flow retarding valve 27.

The cylinder 10 may be supplied with heat-transfer fluid, here assumed to be refrigerating fluid, by any suitable means. As shown in Figs. 1 and 3 the cylinder is provided with an annular jacket 30 equipped with fluid inlet and outlet pipes 31 and 32 respectively. The jacket may be provided with a spiral baffle 33 to assist in the proper distribution and circulation of the refrigerating fluid.

An outer jacket 36 forming an annular space filled with insulating material 37 may extend around the refrigerant jacket 30 and beyond its ends. This also may serve for the support of various parts of the machine.

The hollow shaft 16 may be mounted in lower and upper bearings 40 and 41 carried by rigid spiders 42 and 43 secured to the frame-like outer jacket 36. The shaft 16 is provided with thrust collars 44 and 45 cooperating with the ends of the bearings 40 and 41 respectively.

The blades 11 may be mounted and operated in any approved and convenient manner. As shown, each blade is mounted on pins 50 carried by pairs of spaced links 51, spacers 52 being placed on the pins 50 on each side of the blades to keep the blades in proper position.

Intermediate their length the links 51 are connected by pins 53 to short links 54 which in turn are connected by pins 55 to shoulder blocks 56 rigidly secured to the hollow shaft 16.

The inner ends of the links 51 are connected by pins 57 to a thrust rod 58 disposed within the hollow shaft 16, slots 59 being provided in the shaft 16 for operating movement of the pins 57.

It will be seen that with this mechanism, the blades 11 are pressed outwardly in a radial direction toward the surface of the cylinder when the thrust rod 58 is pulled upward and are withdrawn clear of the ice sheets S when the thrust rod is moved downward.

The upper end of the thrust rod 58 extends beyond the end of the hollow shaft 16 and is provided with a free turning thrust connection 62, the non-rotatable sleeve of which is provided with pins 63 to which thrust links 64 are attached. At their upper ends the links 64 are connected by a pin 65 to an operating lever 66 mounted in upstanding brackets 68 secured to the top of the frame-like jacket 36.

The other end of the lever 66 is connected by a pin 69 to an adjustable driving link 70, the other end of the link 70 being connected to a crank pin 71 carried by the shaft 72 of a gear reduction or timing unit 73 driven by a motor M. The adjustment in link 70 determines how near the blades 11 will come to the surface of the cylinder.

The hollow shaft 16 is turned intermittently when the blades are in retracted position by any suitable means. As shown in Figs. 1 and 2, a ratchet disk 77 is rigidly secured to the shaft 16 near its upper end. The ratchet disk is turned by a pawl or claw 78 attached to a pawl rod 79 slidably mounted in a guide 80 secured to a fixed bracket 81. A spring 82 keeps the pawl pressed toward the teeth of the ratchet disk when moving in one direction but permits the pawl to move outward and slip over the ratchet teeth when moving in the other direction.

The outer end of the pawl rod 79 is slidable through an opening provided in the end of an operating arm 83 secured to the shaft 67 of the blade operating lever 66 previously mentioned. The pawl rod is provided with spaced nut and lock-nut stops 84 which may be adjusted to vary the stroke of the pawl and thereby vary the width of ice strips removed by the blades 11.

It will be observed that the pawl turns the ratchet disk only during part of the down stroke of the thrust rod 58 while the blades are being retracted and that there is no turning action while the thrust rod is moving upward to cause the blades to remove the strips of ice from the cylinder.

To assist in the proper distribution of water on the surface of the cylinder and to avoid freezing on the upper end of the cylinder, an insulating member 87, which may be formed of rubber, is provided on the upper end of the cylinder. This member has an inclined surface for spreading the water and directing it evenly and smoothly to the upper edge of the cylinder. If ice forms on the member 87 it will be removed by the blades 11 which are made long enough for this purpose.

Preferably a considerable excess amount of water is caused to flow down over the cylinder so as to thoroughly wash the ice being formed thereon and thereby produce a clear grade of ice. The lower end of the cylinder is tapered outwardly to cause the excess water to flow outward into the catch-trough 19, leaving the central space open for the falling ice. In order to keep the drip water from freezing the catch-trough 19 may be lined with insulation 90.

The ice produced may fall through a hole in the floor or platform on which the machine is mounted, and be received in any suitable bin or container below the floor or may be disposed of in any other desired manner. Since the ice is dry it flows freely and may be handled with ease and economy.

The shape of the ice produced also contributes to ease in handling and avoids to a large extent the congealing together of the ice particles. And if the particles do congeal together the connection will be over relatively small surfaces and not over large areas, thus leaving the interior of a mass of the ice full of spaces through a great many of which air may circulate, thus making the product very desirable and efficient for refrigerating purposes.

The ice shapes produced have been found to run toward the typical form P shown in Fig. 5 in perspective.

The side edges P1, P2 are roughly straight and generally parallel where severed by the blades 11 (provided straight blades are used); the upper and lower edges are broken at P3, P4 on the bias; the outer surface P5 is quite smooth where it was formed on the surface of the cylinder; the inner surface (not shown) is relatively smooth but may be somewhat rivuleted and ridged from the flow of water thereover; and many cracks of irregular pattern appear on the outer surface P5 and the inner surface. Depending upon the amount of super-cooling, the thickness, the height of fall, and other factors the ice may break along some of the incipient cracks into smaller pieces of completely random shape like crushed or chipped ice, the pieces, however, not being so small as to destroy the usefulness of the ice. On the contrary, the sizes and shapes produced are of the type which has been found most nearly ideal for broken ice.

The operation of the apparatus will be apparent from the above description. A commercial size machine, built according to the principles of the invention as described above, has been operated over long periods continuously, day and night, without an attendant, with completely satisfactory results. The machine delivered more than its rated capacity of ice and the ice produced was quite clear and crystalline in appearance.

The machine has also been built and successfully operated in relatively small sizes. In fact, it appears that the machine may be built and operated successfully in a very great range of sizes.

The machine is very economical in floor space, larger capacity readily being attained merely by increasing the height of the freezing cylinder, if desired. The machine also provides for the easy automatic removal and disposal of the product. The parts are few, simple and inexpensive and easily maintained in operating condition. Moreover, the machine, particularly the internal cylinder type, is of such a nature that it may be substantially completely assembled at the factory and shipped in assembled condition, thus avoiding the necessity for maintaining a large force of men in the field for erecting and servicing machines.

While one embodiment of the invention has been illustrated and described in detail, it is to be understood that the invention may be variously embodied and modified within the limits of the prior art and the scope of the sub-joined claims.

I claim:

1. A machine for producing a brittle congealed product, comprising in combination, a vertical heat-transfer cylinder providing a relatively smooth surface on which said substance is formed, means for supplying a heat-transfer medium to the side of said cylinder opposite said surface, means for supplying around the upper edge of said cylinder liquid to be solidified so it will solidify in a sheet as it flows down said surface, means including a vertical radially movable wedge-shaped blade for penetrating said congealed sheet along a line spaced inwardly from the edge thereof to remove a strip from said sheet and from said surface, and means beneath the lower edge of said cylinder for receiving the excess liquid flowing off the cylinder.

2. An ice machine comprising an upright cylinder having a freezing surface, means for refrigerating said surface, means for supplying water to be frozen to said surface to form an ice layer thereon, ice removing mechanism associated with said surface, said mechanism including a blade extending longitudinally of said cylinder, means for reciprocating said blade toward and from said cylinder to cut ice pieces from said layer, and means for imparting a step by step movement to said blade around said cylinder timed with the said refrigerating means to permit said layer to build to a predetermined thickness before being acted upon by said blade.

3. A machine for producing free bodies of a brittle substance comprising, in combination, a supporting member provided with a rigid surface on which a body of the substance is formed and to which it is adhered, and means operatively associated with said supporting member movable in a controlled manner relative to said surface for imparting along an edge portion of said body and spaced in from the edge thereof a relatively slow powerful compressive force and imparting a corresponding oppositely directed compressive force to a more resistant element stationary with respect to said surface, to push the edge portion to which the force is applied along said surface thereby to break its attachment to said surface and cause it to be cleanly freed from the surface.

4. The method of commercially producing free bodies of a congealed product which comprises supplying a heat exchange medium to one side of a heat exchange member, supplying fluid to be solidified to the other side of said member to form a solid sheet thereon, applying successive wedging forces to said solid sheet along lines parallel to and spaced in from the edge of said sheet to wedge successive edge portions of said sheet from the main body thereof to sever the successive portions from the sheet and to break their attachment to said heat exchange member to cause each portion to be separated cleanly from the heat exchange member.

5. In apparatus for freezing a liquid, in combination, a rigid freezing surface, means for supplying to said surface liquid to be frozen, means for exerting a wedging pressure only on said surface along successive lines spaced sufficiently in from but sufficiently close to the edge of said frozen liquid to cause the edge portion of said frozen liquid to separate from the body thereof and from said freezing surface in the form of relatively large pieces, said wedging means and freezing surface having a progressive relative movement, and means supplying liquid to said freezing surface operating in such manner that the frozen liquid is not subjected to the liquid to be frozen at the time of contact by said wedging means.

6. In apparatus for freezing a liquid, in combination, a cylinder having a rigid freezing surface, means for supplying to said freezing surface liquid to be frozen to form a brittle layer thereon and adhering thereto, and means adapted to exert a radial pressure on the frozen liquid for completely severing narrow strips of the frozen liquid from the body thereof and breaking the adherence with the freezing surface.

7. The method of manufacturing a congealed product from a fluid including the steps of congealing the fluid in a brittle layer on a congealing surface, exerting on said brittle layer congealed on said surface slow wedging actions along successive lines across said layer and spaced back from the edge thereof to separate successive edge portions of said layer from the main body thereof and from the congealing surface.

8. The method of commercially producing free bodies of a brittle congealed substance which comprises supplying the substance in a fluid state to a rigid congealing surface to form a brittle layer thereon and adhering thereto, so moving a cutting implement with respect to the layer as to cause the cutting implement to effect a succession of uniformly spaced penetrations into the layer, and causing the cutting implement at each penetration to develop a force acting along the line of penetration and on the border portion segregated from said layer by such penetration, the direction and intensity of said force and the spacing of the lines of penetration with respect to the compressive strength of the layer and the force of adhesion of the surface being so selected as to break the bond between the surface and said border portion without overcoming the compressive strength of said border portion.

9. The method of commercially producing free bodies of a brittle congealed substance comprising supplying the substance in fluid state to a congealing surface of a rigid member to form a brittle layer of relatively uniform thickness on and adhering to said congealing surface, and applying to said layer a force acting on a border portion of said layer said force having a first component acting along a narrow area in a direction normal to said layer to cut into said layer and a second component acting in a direction parallel to said layer and of a magnitude sufficient to overcome the shearing strength of the bond between said surface and said border portion without exceeding the compressive strength of said congealed substance.

10. The method of commercially producing free bodies of a brittle congealed substance comprising supplying a heat exchange fluid to one side of a heat exchange member, supplying fluid to be solidified to the other side of said member to form a sheet of the brittle congealed substance thereon having an edge along which a substance-removing operation is carried on, and applying a wedging force along a line substantially parallel to said edge and dividing an edge portion of the sheet from the remainder of the sheet, said wedging force being effective to wedge the edge portion from the sheet and from the heat exchange member.

11. A machine for commercially producing free bodies of a brittle congealed substance comprising a rigid congealing surface to which the substance in fluid state is supplied, means to supply the fluid to said surface to congeal thereon a brittle layer of substantially uniform thickness adhering thereto, wedging means, means for relatively moving said congealing surface and said wedging means continually to present a fresh layer beneath said wedging means, and means to move said wedging means toward and away from said surface to penetrate said layer and impart a wedging action to the layer along a line dividing a border portion of the layer from the remaining portion of the layer, said wedging action being sufficiently slow to break the adhering bond and remove the border portion from the congealing surface without overcoming the compressive strength of said border portion, said moving means and wedging means being so constructed and arranged that said wedging means has radial movement only with respect to said surface as said wedging means penetrates said layer.

12. A machine for commercially producing free bodies of a brittle congealed substance comprising a rigid congealing surface to which the substance in fluid state is supplied, means to supply the fluid to said surface to congeal thereon a brittle layer of substantially uniform thickness adhering thereto, wedging means comprising a serrated blade movable substantially normal to said congealing surface, and means to move said serrated blade toward and away from said surface to penetrate said layer and impart a wedging action to the layer along a line dividing a border portion of the layer from the remaining portion of the layer, said wedging action being sufficiently slow to break the adhering bond and remove the border portion from the congealing surface without overcoming the compressive strength of said border portion.

13. Apparatus as described in claim 11 wherein said congealing surface is in the form of a stationary cylinder and said wedge means is movable, and the congealing operation is carried on substantially continuously with the wedging action removing the congealed substance from one end of the layer while the layer is being built up along the other end.

14. Apparatus as described in claim 11 wherein said congealing surface is in the form of a substantially vertically positioned cylinder with the ice being formed on the inner surface of the cylinder and with two diametrically oppositely positioned wedge means working on diametrically opposed areas of the cylinder.

15. In apparatus for manufacturing a brittle congealed product, in combination, a rigid congealing surface, means for supplying fluid to said surface to form a brittle congealed layer thereon, and means for removing successive strips of said congealed layer, said last-named means including wedging means and means for mounting said wedging means for relative movement with respect to said surface, said wedging means and the mounting means therefor being constructed and arranged to cause a succession of penetrations of the wedging means into the layer of such character as to cut the layer into a succession of strips and exert a force at each penetration to break the bond between said congealing surface and the strip being cut from the layer.

16. In apparatus for commercially producing a brittle congealed product, the combination of a rigid congealing surface, means for supplying fluid to said congealing surface to form a brittle congealed layer thereon, and means for removing successive border portions of said congealed layer comprising, wedging means, means mounting said wedging means for relative movement with respect to said congealing surface, and means for causing a succession of penetrations of said wedging means into the congealed layer and upon each penetration to thereby apply force to the congealed layer near the end thereof and along a narrow area to cut into said layer and sever the border portion from the body of the congealed layer and to apply force against the body of the border portion in a direction parallel to said congealing surface to act through the body of the border portion to break the bond between the border portion and the congealing surface to free the border portion as a body from the congealing surface without overcoming the compressive strength of said border portion.

17. In apparatus for commercially producing a brittle congealed product, the combination of a rigid congealing surface, means for supplying fluid to said congealing surface to form a brittle congealed layer thereon, and means for removing successive border portions of said congealed layer comprising, wedging means, means mounting said wedging means for relative movement with respect to said congealing surface, and means for imparting motion to said wedging means to move it toward and away from said congealing surface and for imparting relative traveling motion between said wedging means and said congealing surface to cause the one to travel with respect to the other but to maintain the traveling component substantially zero as said wedging means moves toward said congealing surface, said wedging means being effective during its movement toward said congealing surface to penetrate the congealed layer and apply to the body of each border portion force in a direction along the congealing surface and away from the main body of the congealed layer to break the bond between the border portion and the congealing surface without overcoming the compressive strength of said edge portion.

FRANK SHORT.